INVENTOR
ROLAND W. KNAPP
BY Carlsen & Hage
ATTORNEYS

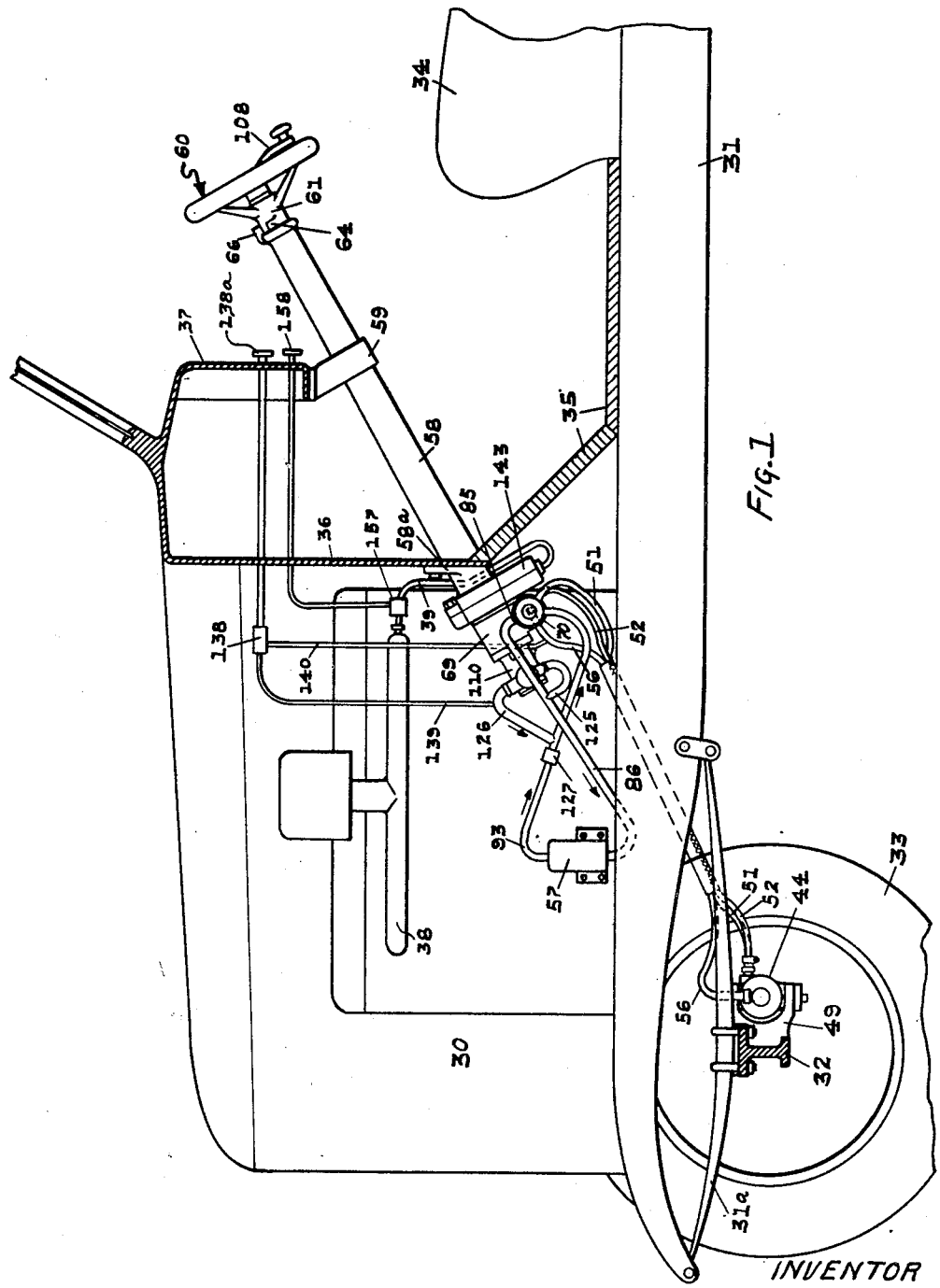

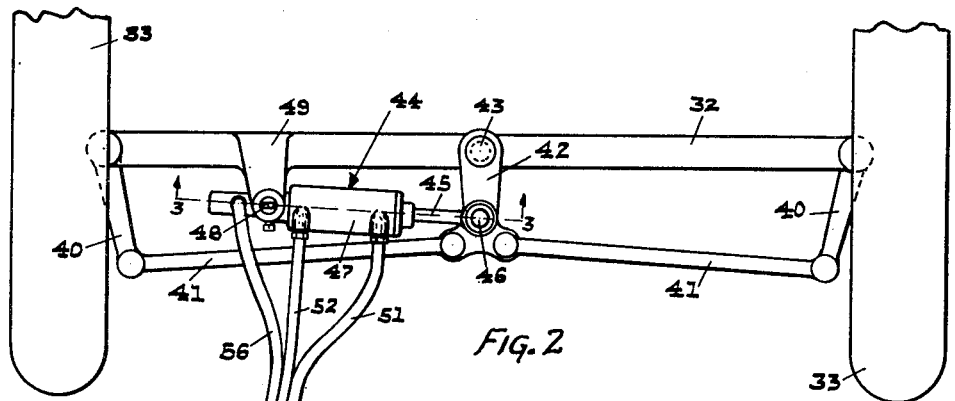
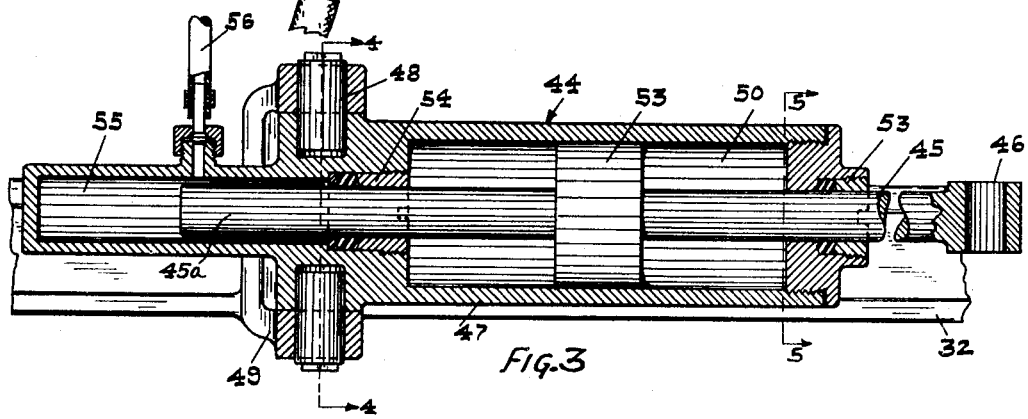
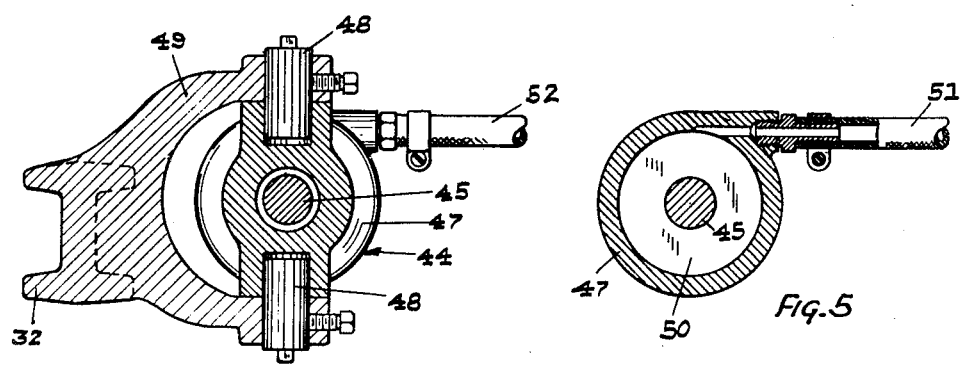

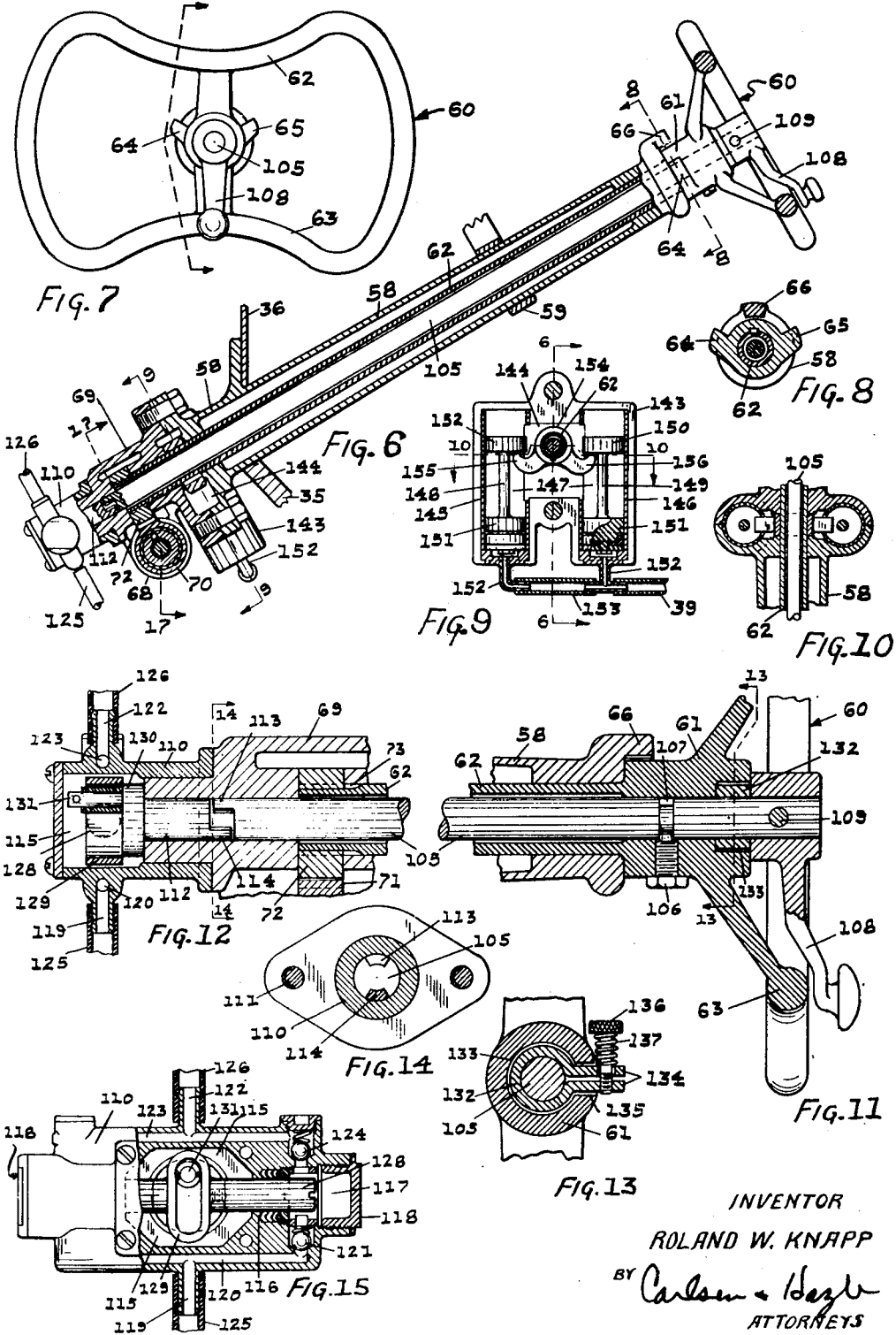

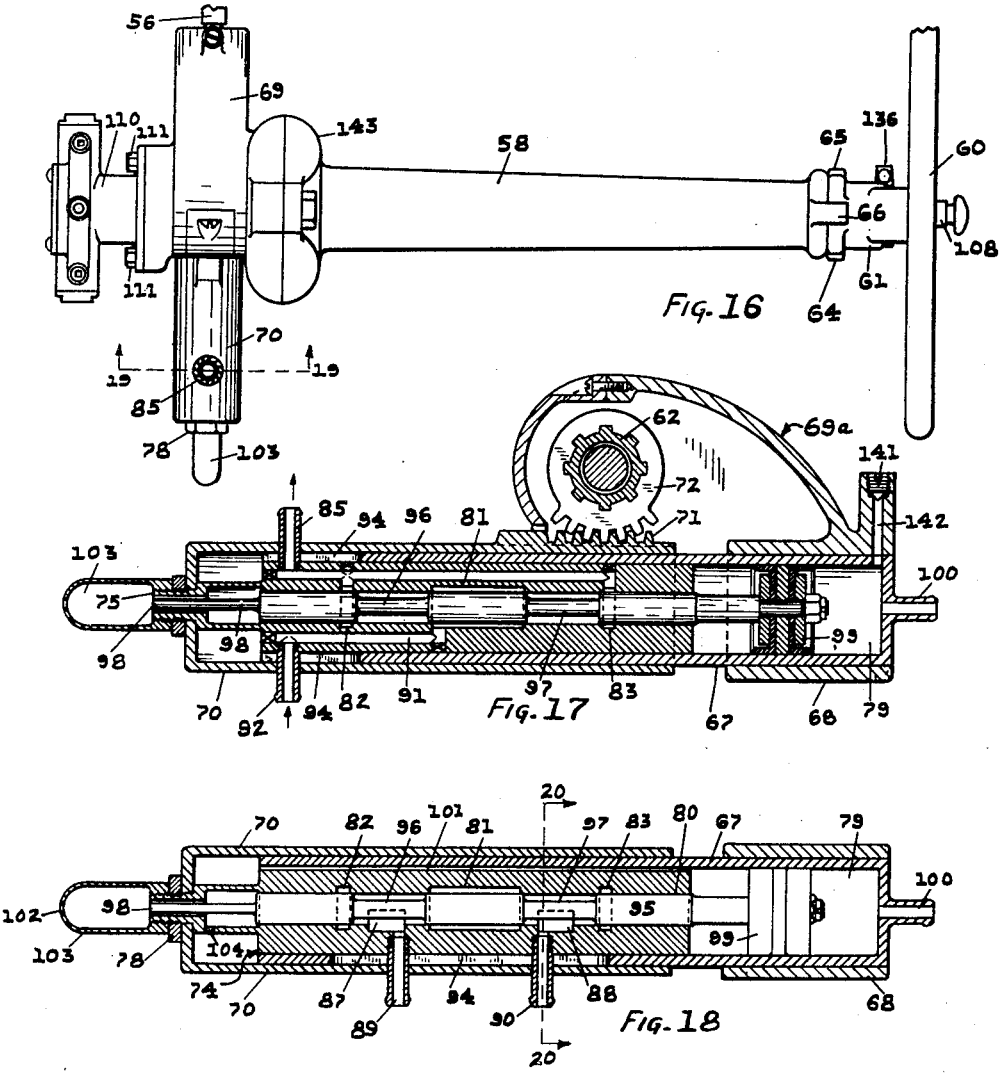

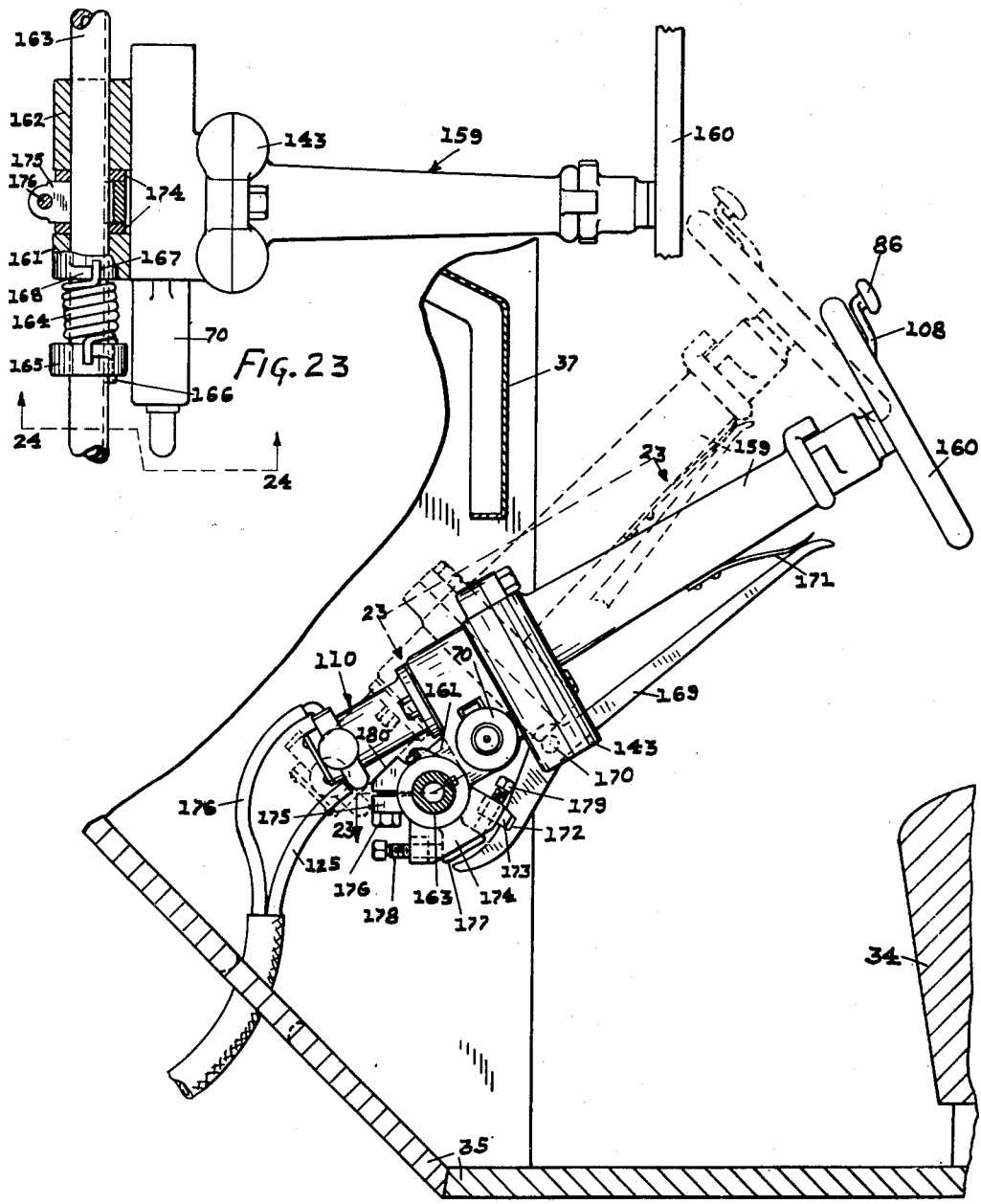

Patented May 9, 1950

2,507,106

UNITED STATES PATENT OFFICE 2,507,106

HYDRAULIC STEERING GEAR FOR MOTOR VEHICLES

Roland W. Knapp, Wayzata, Minn.

Application February 28, 1946, Serial No. 651,026

20 Claims. (Cl. 180—79.2)

1

This invention relates to improvements in steering mechanisms for self-propelled vehicles such as automobiles, trucks, tractors, buses and the like.

The primary object of the invention is to provide mechanism whereby the dirigible ground wheels of such vehicles may be steered by hydraulic power under control of a hand wheel or steering wheel which positions a valve controlling the fluid flow, so that the steering operation may be quite effortlessly and precisely controlled. A further object of the invention is to provide mechanism of this kind in which power necessary for steering the wheels is provided by fluid supplied by an engine operated pump but which further includes a manually operable pump which may be put into use to supply fluid for effecting the steering operations should the engine fail, or it be desired, as it frequently is, to move and steer the vehicle with the engine not in operation. Another object is to provide in a mechanism of this kind means for stabilizing the steering wheel and the steerable wheels of the vehicle or normally holding them in a position for straight ahead travel of the vehicle and restoring them to such position after each movement in either direction as required to effect the steering of the vehicle. Still another object is to provide a stabilizer for this purpose which is operated by the engine of the vehicle and which becomes ineffective when the engine stops, or may be rendered ineffective at any time, so that the steerable wheels may be left at an angle. That is, of course, desirable in parking and other well known operations of such vehicles.

It is further an object of my invention to generally improve the steering mechanisms for vehicles to provide the maximum of convenience, safety and ease in the operation of the vehicles, and to provide a mechanism which will be long wearing and trouble-free in operation.

In the drawings, which illustrate a preferred embodiment of the invention:

Fig. 1 is a side elevation, partly in section, of a motor and a portion of the chassis of a motor vehicle, with which is associated the elements of my improved steering mechanism for controlling the operation of the steerable supporting wheels of the vehicle.

Fig. 2 is a plan view of the front axle and ground wheel structure of a motor vehicle, showing parts in my hydraulic steering mechanism operably associated therewith.

Fig. 3 is an enlarged detail section on line 3—3 of Fig. 2.

2

Fig. 4 is a section on line 4—4 of Fig. 3.

Fig. 5 is a section on line 5—5 of Fig. 3.

Fig. 6 is a sectional elevation through the steering post and showing the arrangement of hand pump, control valve stabilizer, and associated parts.

Fig. 7 is a plan view of a preferred form of steering wheel for use in this device.

Fig. 8 is a sectional detail view taken on line 8—8 of Fig. 6, showing the hand steering wheel limiting stop.

Fig. 9 is a sectional detail view taken on line 9—9 of Fig. 6.

Fig. 10 is a section on line 10—10 of Fig. 9.

Fig. 11 is a fragmentary view, partly in diametrical section, of the steering wheel, steering post, hand-crank, and friction clutch.

Fig. 12 is a fragmentary, sectional view, of the hand pump, and the lower end of the steering column.

Fig. 13 is a detail section on line 13—13 of Fig. 11.

Fig. 14 is a detail section on line 14—14 of Fig. 12.

Fig. 15 is an elevational view, parts being broken away to disclose the hand pump construction.

Fig. 16 is a plan view of the steering post, control valve and hand pump.

Fig. 17 is a section through the control valve and adjacent parts, on the irregular lines 17—17 in Figs. 6 and 19.

Fig. 18 is a sectional view through the control valve but on the line 18—18 in Fig. 20.

Fig. 19 is an enlarged sectional view of the control valve on line 19—19 of Fig. 16.

Fig. 20 is a section on line 20—20 of Fig. 18.

Figure 21:
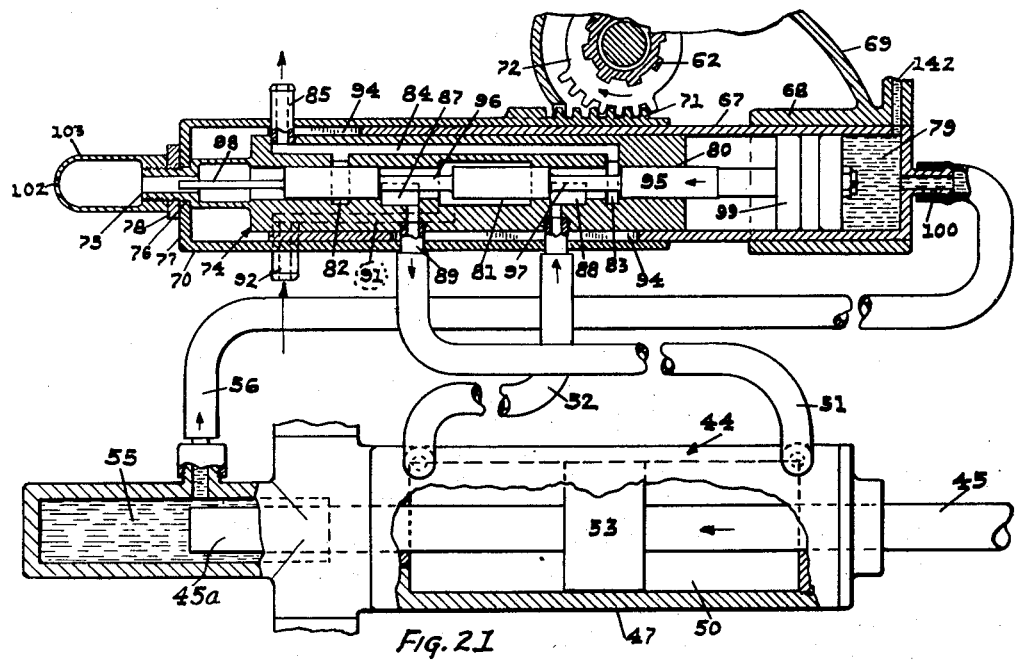

Fig. 21 is a sectional view through the control valve and showing it in its association with the hydraulic steering unit.

Figure 22:
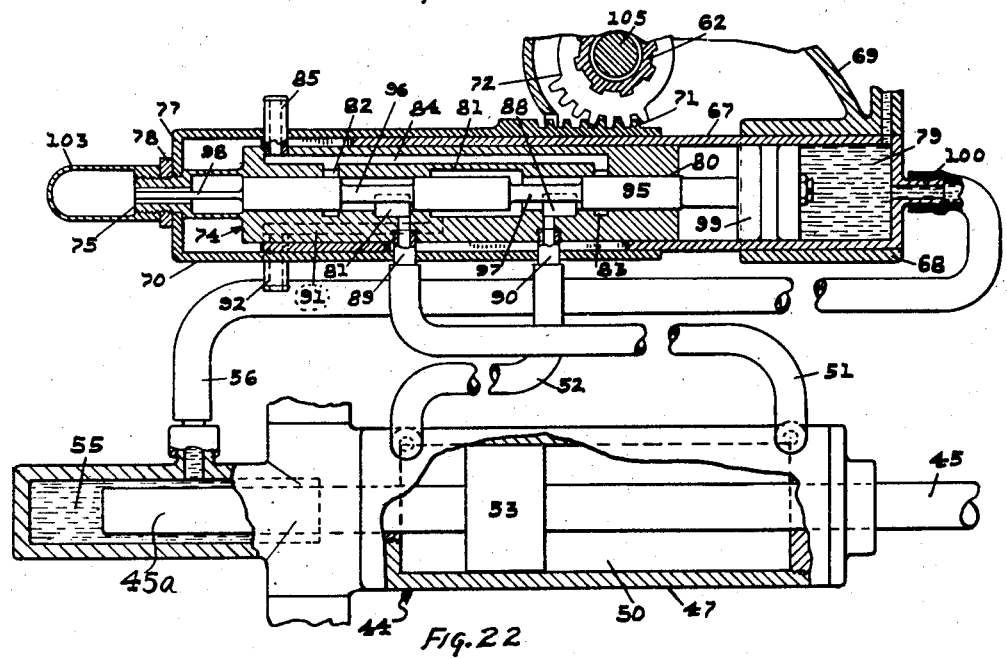

Fig. 22 is a view similar to Fig. 21 except the valve means is shown actuated to the left where the control valve is in closed position preventing further operation of the hydraulic steering unit.

Fig. 23 is a plan view, partly in section, on line 23—23 of Fig. 24 disclosing a modification of the steering post.

Fig. 24 is an elevational view of the modification of the steering post structure as on line 24—24 in Fig. 23.

Referring to the drawings more particularly and by reference characters, 30 designates the engine of a motor vehicle having a frame 31 yieldably supported by springs 31ᵃ on a steering assembly comprising an axle 32 and dirigible ground wheels 33. The vehicle also includes such conventional parts as the driver's seat 34, foot boards 35, dash plate 36 and instrument panel 37. The engine 30 has an intake manifold 38 from which suction is obtained through a vacuum line 39 to actuate the stabilizer unit of the steering mechanism as will presently be set forth.

The wheels 33 are mounted on pivoted spindles having cranks 40 (Fig. 2) connected by links 41 to an arm 42 pivoted centrally as at 43 to the axle 32 in such manner that when the arm 42 is oscillated from side to side it will operate through the links 41 and cranks 40 to steer the wheels 33 as may be desired.

The arm 42 is actuated by a steering motor in the form of a telescopic hydraulic unit 44, the piston rod element 45 of which is pivoted as at 46 to the arm, while the cylinder portion 47 of the unit is here shown for example as pivoted at 48 to a lug 49 extending rigidly and rearwardly from the axle 32 at a point spaced laterally from the arm 42, as best shown in Fig. 2.

The cylinder 47 of the hydraulic unit 44 has a chamber 50 (see Figs. 3, 21 and 22) for the reception of fluid into either end thereof from conduits 51 and 52, and the piston rod 45 has a head 53 mounted in the chamber 50 for actuation in either direction with the rod, in response to fluid pressure selectively introduced into the respective ends of the chamber. The rod 45 is slidable in oil tight bearings 53 and 54, one at each end of the chamber 50, and the inner end 45ª of the rod extends through the bearing 54 into a second and smaller chamber 55 into which fluid is injected or withdrawn by means of a conduit 56.

Fluid for operating the hydraulic unit 44 is supplied by a pump 57 mounted on and driven by the engine 30 and this fluid is directed into the conduits 51 and 52 selectively, to actuate the piston rod 45 in either direction by a valve mechanism later to be described, and which is adjusted and controlled by a steering wheel assembly including a steering column housing 58 which is formed with a support and bearing casting or bracket 58ª at its lower end adapted to be secured to the foot boards 35 and plate 36 or otherwise suitably supported. Further support is provided by a bracket 59 hung from the instrument panel 37 and the upper rear end of the housing 58 is so located that a steering wheel 60 engaged at this end will be conveniently and conventionally located with respect to the seat 34. The steering wheel 60 has a spoked hub 61 and this hub is formed upon the end of a tubular steering column or shaft 62 which is journaled in and through the housing 58.

As seen in Fig. 7 the steering wheel rim is not the usual full circle but has inwardly or reversely curved portions 62 and 63 at top and bottom (when the wheel is in normal position) and these reversely curved portions provide, respectively for better forward vision and added clearance or lap room beneath the wheel as will be readily understood.

Turning the steering wheel 60 oscillates the steering shaft 62 about its axis but in accordance with my invention the movement of the wheel may be much reduced as compared to ordinary practice and I accordingly provide on the hub a pair of spaced, radially projecting fingers 64 and 65 which engage a stop 66 formed on the upper end of the housing 58 and limit the total movement, in either direction, of the wheel.

The valve mechanism actuated by the steering wheel is best shown in Figs. 17 through 22 and comprises a stationary sleeve 67 which is supported by a collar 68 on a housing 69 which in turn is rigidly supported from the bracket 58ª by the intervening stabilizer assembly later to be described. The sleeve 67 is so supported that its axis extends tangentially to a circle centered about the axis of the steering shaft 62 which enters housing 69. Slidably and telescopically fitted over the sleeve 67 is an outer, movable sleeve 70 and a portion of this sleeve is provided, within housing 69, with teeth forming a gear rack 71 cooperating and meshing with a sector gear 72 upon steering shaft 62, the arrangement being such that oscillation of the steering shaft about its axis will be translated to reciprocating or endwise movements of the sleeve 70. The shaft 62 is splined into the gear 72 as seen at 73 to permit the shaft to be pulled out endwise to disassemble the parts as will be readily evident.

Slidable within the inner stationary valve sleeve 67 is a valve body or cage indicated generally at 74, and this element has a reduced tubular neck portion 75 which penetrates an opening 76 in the end 77 of the sleeve and is secured thereto by a lock nut 78 so that the sleeve and element 74 move as a unit. The valve body 74 is shorter than sleeve 67 and is so arranged that in all positions there will be a chamber 79 left in the sleeve at the end of the body 74 opposite that anchored as aforesaid to the end of sleeve 70. The body 74 is bored out from end to end as indicated at 80 and formed in this bore is a diametrically enlarged central chamber 81 and at spaced points to either end thereof are similar but narrower enlargements forming fluid outlet ports 82 and 83 which both communicate with an outlet passage or duct 84 formed in the valve body and leading to a tapped opening in which is threaded a nipple 85. The nipple 85 extends radially out through an opening in the sleeve 70 and is fitted with a flexible conduit 86 leading to the low pressure or return side of the pump 57. Between the outlet ports 82 and 83 and the adjacent ends of the chamber 81 the bore 80 further has enlargements forming ports 87 and 88 with which communicate tapped openings receiving nipples 89 and 90 also extending radially out through openings in the sleeve 70. The aforesaid conduits 51 and 52 are fitted over these nipples 89 and 90 respectively. An inlet passage or duct 91 extends lengthwise in the valve body 74 and at one end communicates with the chamber 81 while at its other end it has a tapped opening in which is positioned a nipple 92 extending radially out through the sleeve 70. A flexible conduit 93 connects the nipple 92, and hence the passage 91 and chamber 81, with the high pressure or discharge side of the pump 57. It will be noted that the inner sleeve 67 is provided with slots 94 in its walls wherever necessary to clear the nipples 85, 89, 90 and 92 and permit the necessary endwise movements of the sleeve 70 and valve body 74.

Slidably mounted in the bore 80 of the valve body 74 is a valve rod or plunger 95 the diameter of which is such as to nicely fit the bore. At two spaced points the valve rod 95 is reduced in diameter as indicated at 96 and 97 and further at one end the rod has a diametrically reduced registering or locating finger 98 which extends loosely into the neck 75 of the sleeve 70. The opposite end of the valve rod 95 has secured thereto a piston or head 99.

The chamber 79 between the piston 99 and the end 100 of the sleeve 67 is filled with fluid, as is the aforesaid chamber 55 in the steering unit 44 and the conduit 56 which connects the chamber 55 to a nipple 100 communicating with chamber 79.

The side of the piston 99 opposite that exposed to the fluid in chamber 79 is subjected to atmospheric pressure by admitting air into sleeve 67 between the piston and valve body 74 in any suitable manner. As here shown the valve body has a longitudinal groove 101 in its peripheral surface for this purpose, and air enters initially through a small opening 102 in a dust cap 103, which is screwed on the neck 75, and enters the interior of sleeve 70 through a small port 104 as seen in Fig. 18.

The operation of the mechanism as thus far described is as follows: With the steering wheel 60 and steerable ground wheels 33 in normal position for straight ahead travel, the valve body 74 and valve rod 95 are in their normal positions of Fig. 17. When the vehicle engine 30 is running then fluid from the pump 57 flows through the conduit 93 into the nipple 92 and through the passage 91 into the main or central valve chamber 81 so that fluid under pressure is present about the valve rod between its reduced portions 96 and 97. However, at this point the part of the rod between said reduced portions 96 and 97 closes the ends of the chamber 81 and the fluid cannot flow from the valve.

Assuming now the steering wheel 60 to be turned toward the right, to steer the vehicle in the same direction, the movement of the sector gear 72 by the steering shaft 62 is in the direction of the arrow in Fig. 21 and this movement travels the outer valve sleeve 70 and valve body 74 to the left, as will be obvious, from its position of Fig. 17. This movement of the valve body 74 is relative to the valve rod 95 and as a result the reduced portion 96 thereof spans the chamber 81 and port 87 (see Fig. 21) placing them in communication. As a result fluid under pressure from the pump 57 may now flow from chamber 81 through the port 87 and nipple 89 into the conduit 51 and into the right hand end of the chamber 50 in the steering unit 44 where its pressure acting on the head 53 moves the rod 45 to the left as viewed in Figs. 2 and 21 and as indicated by the direction arrow in Fig. 21. This motion of the rod 45 is translated by the rods 41 into a movement of the wheels 33 to the right to steer the vehicle in that direction.

Coincident with the movement of the rod 45 in this direction to swing the wheels the end 45ᵃ of the rod in chamber 55 in the steering unit displaces and expels fluid therefrom forcing the fluid through the conduit 56 and into the chamber 79 in the valve. The entrance of this fluid into chamber 79 exerts pressure on the piston 99 moving the valve rod 95 to the left causing it to follow up the valve body 74 until, as seen in Fig. 22, the part of the plunger between reduced portions 96 and 97 isolates the chamber 81 from the previously open port 87. Fluid flow through the conduit 51 to the steering unit 44 is thus cut off and the steerable wheels 33 will remain at the angle selected by the range or extent of the initial movement of the steering wheel 60. A greater steering angle may then be achieved by turning the steering wheel further to again shift the valve body 74 with respect to the valve rod 95 and the same follow up action will again take place to stop the wheels at the latest selected angle.

It will be noted in Fig. 21 that as the port 87 is placed in communication with chamber 81 to permit fluid to flow to the steering unit 44 the port 83 leading to outlet nipple 85 is also placed in communication with port 88. Thus fluid displaced from the left hand end of the chamber 50 by movement of head 53 therein may flow through conduit 52 and nipple 90 into port 88, through port 83 and passage 84 into the conduit 86 leading to the return side of the pump 57 as is obviously necessary.

The operation resulting from movement of the steering wheel 60 back to normal position, as well as beyond that to steer the vehicle to the left will be apparent, it is believed, without further detailed description herein. It will be understood that when the steering wheel is again centered the valve mechanism will assume the position of Fig. 17 and when the vehicle is steered to the left the follow up action of the valve rod 95 is brought about by the aforesaid atmospheric pressure on the piston 99 which asserts itself as fluid is sucked into chamber 55 and from chamber 79 by the movement of the end 45ᵃ of piston rod 45.

Obviously only a small movement of the steering wheel is required to effect normal steering movements and since only the friction of the comparatively few moving parts actually positioned by the steering wheel opposes its movements, and the actual steering power is from the engine, the steering is extremely easy and convenient. However, it is frequently desired to steer the vehicle when the engine is not running and for this purpose I provide a manually actuated pump best shown in Figs. 12 through 15, for supplying fluid to the steering unit 44 under these circumstances.

The hand pump is operated by a pump shaft or rod 105 which is journaled in and through the hollow steering shaft 62. A screw 106 through the steering wheel hub 61 enters a peripheral groove 107 in the pump shaft normally preventing it from moving lengthwise but allowing it to rotate with respect to the steering shaft. A handle 108 is pinned at 109 upon the upper end of the pump shaft 105 for turning the same as will be clearly evident. The hand pump per se comprises a housing 110 which is secured at 111 (Fig. 16) to the lower side of the valve housing 69 and in this pump housing there is journaled a stub shaft 112 coaxial with and spaced from the lower end of the pump shaft 105. The adjacent ends of the shafts 105 and 112 have clutch fingers or teeth 113 and 114 which extend in overlapping relation but are so spaced with respect to each other that the pump shaft 105 may turn through a greater angle than permitted the steering wheel 60 by the stop fingers 64 and 65 before the shaft engages and turns the stub shaft 112. The purpose of this lost motion clutch will presently appear.

The pump housing 110 has a central chamber 115 from which there extends from each end a bore 116 shown in Fig. 15 opening outwardly into a pump chamber 117 closed by an end cap 118. The opposite ends of the pump are duplicates one of the other and only the one is detailed in the drawing. An inlet nipple 119 on the lower side and center of the pump housing communicates with a passage 120 leading out to each pump chamber 117 and in each end of this passage there is provided an inlet ball check valve 121 which will admit fluid to the chamber. An outlet nipple 122 on the top of the housing communicates with a similar passage 123 leading to each chamber 117 and an outlet ball check valve 124 is provided at each end of said passage. The inlet nipple 119 is connected by a conduit 125 (Fig. 1) to the conduit 86 leading from the valve mechanism to the return side of the pump 57 while the outlet nipple 122 is connected by a conduit 126 to the conduit 93 leading from the discharge side of the pump 57 to the inlet nipple 92 of the valve. A check valve 127 is placed in conduit 93 between the pump 57 and the hand pump output conduit 126 and prevents flow from conduit 126 to the pump.

A double ended plunger 128 is provided having one end passing through each bore 116 in the hand pump housing 110 out into the chamber 117, and a "Scotch" yoke 129 is formed at the center of this plunger. An eccentric 130 on the end of the stub shaft 112 has a pin 131 which plays in the yoke 129. The arrangement is obviously such that rotation of the stub shaft 112 in either direction will reciprocate the plunger 128 and its ends will alternately enter and withdraw from the chambers 117 drawing in fluid through the valves 121 and expelling it through the valves 124. The direction of fluid travel is the same in either direction of rotation of the stub shaft 112 and the fluid is taken in through the conduit 125 and expelled through the conduit 126 whence it enters the conduit 93 and, being held against flow back to the pump 57 by the check valve 127, flows to the valve from which the fluid is supplied to the steering unit 44.

A friction clutch connection is provided between the hand pump actuating shaft 105 and the steering shaft 62. As best seen in Figs. 12 and 13 this clutch comprises a clutch band 132 which encircles the pump shaft and is positioned in a recess 133 annularly formed for its accommodation in the steering wheel hub 61. The band 132 is parted and has outwardly and radially turned ends 134 which project through a notch 135 in the side of hub 61, and outwardly of the hub these ends 134 are fitted with an adjustment screw 136 and tension spring 137 in a well known manner. By turning the screw 136 the band 132 may be drawn more tightly, or loosened, upon the pump shaft as will be apparent. It will now be apparent that, as the steering wheel 60 is turned for actuating the steering control valve the engagement of the notch 135 with the clutch band ends 134 will carry along the pump shaft 105 so that it turns with the steering shaft 62. Due to the lost motion connection between the pump shaft 105 and stub shaft 112, however, such movement of the steering wheel will not actuate the hand pump. On the other hand, when the engine 30 is not running and the hand pump actuating lever 108 is put into use for hand pumping the fluid for steering then it is only necessary to turn handle 108 in the direction it is desired to steer the vehicle and the friction clutch 132 will carry the steering wheel 60 along in the same direction, positioning the steering control valve ready for the fluid. Then as the handle 108 is turned further to actuate the hand pump, as the clutch fingers 113 and 114 engage, the clutch 132 will slip allowing such continued rotation of the handle 108 and as the fluid is thus supplied by the hand pump, the wheels 33 will be angled to the proper and desired steering angle.

In connection with the follow up operation of the steering control valve as previously described, it will be evident that the valve rod 95 must return to the central position of Fig. 17 each time the steering wheel 60 is returned to its normal position of Fig. 7 and that perfect synchronization is necessary between the positioning of valve sleeve 70 and valve body 74 by the steering wheel and the positioning of the valve rod 95 by the follow up system. This of course depends on the maintenance of a determined volume of fluid in the chambers 55 and 79 and to facilitate the admission of fluid to the system to replace any lost by leakage I provide a synchronizing valve 138 which may be controlled by a control 138ª as shown from the instrument panel, if so desired, and which has a supply line 139 connected to the pressure side of the system supplying the steering unit and a line 140 which is tapped on the conduit 56 connecting the aforesaid chambers 55 and 79. By opening the valve 138 fluid from the pump 57 may be allowed to run into the chambers 55 and 79 to any required amount and any excess may be permitted to escape by opening a plug 141 (Fig. 17) in a port 142 communicating with chamber 79.

In practice the steering control valve is adjusted or synchronized, with the steering wheel 60 and steerable ground wheels 33 in positions for straight away travel of the vehicle, by admitting fluid to the chamber 79, or bleeding off excess fluid therefrom as may be required, to bring the end of the registering finger 98 even with the end of the neck or bushing 75 as it is shown in Fig. 17. Removal of the cap 103 allows the position of the registering finger to be observed. Thereafter as long as the fluid volume in the follow up system remains the same perfect synchronization will be maintained, and any occasional adjustments required may be readily made, as described.

I also provide a stabilizer mechanism the purpose of which is to normally hold the steering wheel 60 in position calling for straight away travel of the vehicle and this mechanism comprises a housing 143 which is formed as a part of the bracket casting 58ª and which embraces the lower part of the steering shaft 62. Within this housing 143 (Figs. 6, 9 and 10) there is formed a central chamber 144 and at opposite sides thereof there are supported tubular casings 145—146 having openings 147 on inner sides communicating with this chamber. Spool-like operating plungers 148—149 are slidably positioned in the casings 145—146 and have upper peripheral or annular flanges 150 and lower head portions 151. The lower ends of the casings 145—146 are closed except for nipples 152 which are connected together by a conduit 153 and together are connected to the previously mentioned vacuum lines 39. A hub 154 is secured to the steering shaft 62 within the chamber 144 and fingers 155 and 156 extend in opposite directions from the hub out through the openings 147 into the casings 145—146 beneath the flanges 150 on the operating plungers 148—149. In normal position (Fig. 9) the plungers 148—149 rest with their head portions 151 in seating engagement with the lower ends of the casings.

Now with the engine running and vacuum or suction present in vacuum line 39 the movement of the steering wheel 10 in either direction will cause one of the fingers 155 or 156 to move upwardly and raise the corresponding plunger 148 or 149 but the suction will be sufficient to return the plunger downward to its seat again when the steering wheel is released as will be understood. Of course, only the one plunger 148 or 149 will be moved up at a time due to the opposite action of the fingers 155 and 156. The steering wheel and entire steering mechanism will thus be "centered" at all times by this stabilizer so long as the engine is running without, however, preventing such steering movements as may be required.

It will be noted that the use of vacuum from the engine for this stabilizing action is of advantage in that, when the engine is not running, there will be no stabilizing tendency or action and the wheels may be left at any angle desired. Thus parking is facilitated. However, I may further provide a valve 157 (Fig. 1) in the vacuum line 39, with a flexible shaft connection to an instrument panel control 158, so that the vacuum may be shut off at any time, to free the steering of the stabilizing action if desired.

Referring now to Figs. 23 and 24 I show therein a pivotal support and lock mechanism for a steering housing 159 and steering wheel 160, it being understood that, aside from this support and lock the housing 159, wheel 160 and the associated steering control valve, hand pump and stabilizer are all exactly as previously described herein. Corresponding parts are accordingly given the same reference numerals. In this arrangement the valve housing is provided with spaced bearings 161 and 162 which are pivotally mounted upon a shaft 163 supported rigidly transversely beneath and forwardly of the instrument panel 37. Such pivotal mounting obviously permits the steering column housing 159 to swing in a vertical plane at its rear end, and the housing is normally and yieldably urged in an upward direction by a torsional coil spring 164 one end of which is anchored to the shaft 163 by a collar 165 keyed at 166 thereto. The other end 167 of the spring engages a finger 168 on the bearing 161 and normally biases the lugs in such direction as to elevate the rear end of the steering housing and the steering wheel 160 thereon. A latch lever 169 is fulcrumed at 170 upon the stabilizer housing 143 and at its upper end extends along and beneath the housing 159 into a position convenient for actuation by the driver. A spring 171 secured to housing 159 biases the latch lever upwardly at its lower end and said lower end is formed with a notch 172 adapted to engage a hook 173 formed upon and between plates 174 pivotally mounted on the shaft 163. A clamp collar 175 is adjustably secured by a clamp screw 176 upon shaft 163 between the plates 174 and has a depending lug 177 against which are adjusted set screws 178—179 threaded through ears on the plate 174. It is obvious that, by adjusting the set screws 178—179 the angular relation of the plates 174 may be adjusted with respect to the shaft 163 and that thereby the lowered position of the steering wheel, determined by engagement of the notch 172 with the hook 173, may be adjusted to bring the wheel to a convenient height for such driver. When the latch lever is manipulated to free the notch 172 from the hook 173 the spring 164 will swing the steering wheel upwardly as shown in dotted lines in Fig. 24 thus providing greater clearance in entering or leaving the vehicle. The entire steering assembly may also be shifted left or right along the shaft 163 merely by loosening clamp screw 176.

The upward movement of the steering wheel is limited by engagement of the hand pump housing 110 with a stop surface 180 on the clamp collar 175. The shape of the lower end of the latch lever 169 is such that it will cam over and automatically engage the hook 173 when the steering wheel is pulled down to driving position.

It is understood that suitable modifications may be made in the structure as disclosed, provided such modifications, come within the spirit and scope of the appended claims. Having now therefore fully illustrated and described my invention, what I claim to be new and desire to protect by Letters Patent is:

1. In a steering gear for the steerable wheels of an engine operated vehicle, the combination comprising, a fluid operated steering motor operatively arranged to steer said wheels, a power operated source of fluid under pressure, a manually operative valve mechanism having one manually movable member for controlling the flow of fluid to and from the steering motor, said valve mechanism also having a second movable member operated by the motion of the steering motor to follow up the movement of the first mentioned movable member and to shut off fluid flow to the steering motor when it has steered the wheels to a position called for by each adjustment of the valve mechanism, and a manually operative source of fluid under pressure to provide fluid when the power operated source is inoperative.

2. In a steering gear for the steerable wheels of an engine operated vehicle, the combination comprising, a fluid operated steering motor operatively arranged to steer said wheels, a power operated source of fluid under pressure, a manually operative valve mechanism for controlling the flow of fluid to and from the steering motor, cooperating fluid actuated follow up mechanism associated with the steering motor and valve mechanism and operative by said steering motor to halt the operation thereof when it has operated to a position called for by each manually selected position of the valve mechanism, a manually operative fluid source for supplying fluid to the steering motor when the power operated fluid source is inoperative, and a stabilizer device operatively arranged to return the valve mechanism to a normal position when the manual effort on the valve is removed.

3. In a steering gear for the steerable wheels of an engine operated vehicle, the combination comprising, a fluid operated steering motor operatively arranged to steer said wheels, a power operated source of fluid under pressure, a manually operative valve mechanism having a normal position and movable manually from such position for controlling the flow of fluid to and from the steering motor, follow up mechanism operative by the steering motor to halt the operation thereof when it has operated to a position called for by each manual adjustment of the valve mechanism, a manually operated fluid source for supplying fluid to the steering motor when the power operated fluid source is unavailable for use, a stabilizer device normally operative to return said valve mechanism to said normal position when manual effort on the valve is removed, and means for rendering the stabilizer device ineffective so that the valve mechanism will remain in any adjusted position.

4. In a steering gear for the steerable wheels of an engine operated vehicle, the combination comprising, a fluid operated steering motor operatively arranged to steer said wheels, a power operated source of fluid under pressure, a manually operative valve mechanism having a normal position and movable manually from such position for controlling the flow of fluid to and from the steering motor, follow up mechanism operative by the steering motor to halt the operation thereof when it has operated to a position called for by each manual adjustment of the valve mechanism, a manually operated fluid source for supplying fluid to the steering motor when the power operated fluid source is unavailable for use, a stabilizer device normally operative to return said valve mechanism to said normal position when manual effort on the valve is removed, and the said stabilizer device being actuated by the vehicle engine and therefore being ineffective to so return the valve mechanism when said engine is not running.

5. In a steering gear for the steerable wheels of an engine operated vehicle, the combination comprising, a fluid operated steering motor operatively arranged to steer said wheels, a power operated source of fluid under pressure, a manually operative valve mechanism having a normal position and movable manually from such position for controlling the flow of fluid to and from the steering motor, follow up mechanism operative by the steering motor to halt the operation thereof when it has operated to a position called for by each manual adjustment of the valve mechanism, a manually operated fluid source for supplying fluid to the steering motor when the power operated fluid source is unavailable for use, a stabilizer device normally operative to return said valve mechanism to said normal position when manual effort on the valve is removed, and the said stabilizer device being vacuum operated by suction from the vehicle engine.

6. In a steering gear for the steerable wheels of an engine operated vehicle, the combination comprising, a fluid operated steering motor operatively arranged to steer said wheels, a power operated source of fluid under pressure, a manually operative valve mechanism having a normal position and movable manually from such position for controlling the flow of fluid to and from the steering motor, follow up mechanism operative by the steering motor to halt the operation thereof when it has operated to a position called for by each manual adjustment of the valve mechanism, a manually operated fluid source for supplying fluid to the steering motor when the power operated fluid source is unavailable for use, a stabilizer device normally operative to return said valve mechanism to said normal position when manual effort on the valve is removed, the said stabilizer device being vacuum operated by suction from the vehicle engine, and a manually operative valve for shutting off the suction to the stabilizer device.

7. A steering gear for the steerable wheels of a vehicle, comprising a fluid pressure operated steering motor operatively connected to the wheels, a power operated source of fluid under pressure, a manually operative steering valve for controlling the flow of fluid to and from the steering motor, a follow up mechanism between the steering motor and valve and comprising a fluid actuated valve member and a plunger operative by the steering motor to supply fluid pressure for actuating the valve member to shut off the flow of fluid from the valve to the steering motor when it reaches a position called for by each manual adjustment of the valve, and a manually operative fluid pressure supply for the steering motor.

8. A steering gear for the steerable wheels of a vehicle, comprising a fluid pressure operated steering motor operatively connected to the wheels, a power operated source of fluid under pressure, a manually operative steering valve for controlling the flow of liquid to and from the steering motor, a follow up mechanism between the steering motor and valve and comprising a valve member movable in one direction by fluid pressure and in an opposite direction by atmospheric pressure, a plunger operated by the steering motor for supplying fluid to or withdrawing it from said valve member to actuate the same to shut off the flow of fluid to the steering motor when it has reached a position called for by each manual adjustment of the steering valve, and a manually operative source of fluid pressure for the steering motor.

9. In a hydraulic steering gear for motor vehicles including a fluid operated steering motor, a power operated fluid pressure source for the steering motor, a steering valve for controlling fluid flow to and from the steering motor, and an oppositely movable steering member operatively connected to the valve, a separate manually operated fluid pressure source for operating the steering motor comprising a hand pump rotatably operative in opposite directions to supply fluid to the steering valve and steering motor, an oppositely rotatable handle member for turning the pump, and said handle member having a frictional connection to the steering member whereby movement of the handle in either direction will carry along said steering member to adjust the steering valve to a position for operating the steering motor to steer the vehicle in a direction called for by the direction of rotation of the handle member.

10. The combination with a hydraulic steering gear for the road wheels of a motor vehicle including a fluid operated steering motor operatively connected to said wheels, a power operated fluid source for the steering motor, a steering valve for controlling fluid flow to and from the steering motor, and an oppositely movable steering member connected to the valve for positioning the same, of a manually operative fluid source for supplying the steering motor when the power operated fluid source is inoperative, comprising a hand pump operative to supply fluid through the steering valve to the steering motor, a shaft for operating the pump, a crank member for operating the pump through said shaft, friction means connecting the crank member and the said steering member whereby movement of the crank member will be transmitted to the steering member to position the steering valve, and the said crank member being connected through a lost motion connection with said pump shaft whereby limited movements of the steering member transmitted through said friction means to the crank member will have no effect on the pump shaft.

11. In a steering gear for the steerable wheels of an engine operated vehicle, the combination comprising, a fluid operated steering motor operatively arranged to steer said wheels, a source of fluid under pressure, a manually operative valve mechanism having a normal position and a handle member for moving the valve manually from such position for controlling the flow of fluid to and from the steering motor, follow up mechanism operative by the steering motor to halt the operation thereof when it has operated to a position called for by each manual adjustment of the valve mechanism, and a stabilizer device operating through the handle member to return said valve mechanism to said normal position after the manual effort necessary for each adjustment thereof is removed.

12. In a steering gear for the steerable wheels of an engine operated vehicle, the combination comprising, a fluid operated steering motor operatively arranged to steer said wheels, a source of fluid under pressure, a manually operative valve mechanism having a normal position and movable manually from such position for controlling the flow of fluid to and from the steering motor, follow up mechanism operative by the steering motor to halt the operation thereof when it has operated to a position called for by each manual adjustment of the valve mechanism, a stabilizer device normally operative to return said valve mechanism to said normal position after the manual effort necessary for each adjustment thereof is removed, and said stabilizer device being operated by suction from the vehicle engine and therefore becoming ineffective when the engine is not in operation.

13. The combination in a hydraulic steering gear for the steerable road wheels of a motor vehicle including a fluid actuated steering motor, a fluid source for the steering motor and a manually positionable steering valve for controlling fluid flow to and from the steering motor, of a fluid pressure operated follow up valve mechanism comprising a valve member positioned by fluid pressure taken from said steering motor and operative on said steering valve to shut off fluid flow to the steering motor when it has operated to a position called for by each manually selected position of the steering valve, and means for regulating the volume of fluid effective on said valve member.

14. The combination in a hydraulic steering gear for the steerable road wheels of a motor vehicle including a fluid actuated steering motor, a fluid source for the steering motor and a manually positionable steering valve for controlling fluid flow to and from the steering motor, of a fluid pressure operated follow up valve mechanism comprising a valve member operative to follow up the steering valve and shut off fluid flow to the steering motor, a plunger operated by said steering motor, means for containing fluid in operative relation to both the plunger and valve member and transmitting fluid pressure developed by said plunger to said valve member and for positioning the valve member in accordance with the position of the plunger, and means for regulating the volume of fluid so contained for synchronizing the relative position of the valve member and plunger.

15. In a hydraulic steering gear for the road wheels of a vehicle, the combination comprising, a fluid actuated steering motor operatively connected to steer the wheels, a source of fluid under power produced pressure for actuating said motor, a manually operative means to supply fluid under pressure to the motor when fluid is unavailable from the other source, a manually positionable valve for controlling fluid flow to the motor, and another valve operative by the steering motor to limit the motion thereof.

16. The combination with a hydraulic steering gear for the road wheels of a motor vehicle including a fluid operated steering motor operatively connected to said wheels, a power operated fluid source for the steering motor, a steering valve for controlling fluid flow to and from the steering motor, and an oppositely movable steering member connected to the valve for positioning the same, of a manually operative fluid source for supplying the steering motor when the power operated fluid source is inoperative, comprising a pump, a manually actuable shaft connected through a lost motion connection with the pump, and a friction clutch means connecting the steering member to the pump actuating shaft whereby initial movement of the shaft will carry along the steering member to position the steering valve.

17. In a hydraulic steering gear for motor vehicles including a fluid operated steering motor, a power operated fluid pressure source for the steering motor, a steering valve for controlling fluid flow to and from the steering motor, and an oppositely movable steering member operatively connected to the valve, a separate manually operated fluid pressure source for operating the steering motor comprising a hand pump rotatably operative in opposite directions to supply fluid to the steering valve and steering motor, an oppositely rotatable handle member for turning the pump, and means operatively connecting the handle member to the steering member whereby movement of the handle in either direction will carry along said steering member to adjust the steering valve to a position for operating the steering motor to steer the vehicle in a direction called for by the direction of rotation of the handle member.

18. The combination with a hydraulic steering gear for the road wheels of a motor vehicle including a fluid operated steering motor operatively connected to said wheels, a power operated fluid source for the steering motor, a steering valve for controlling fluid flow to and from the steering motor, and an oppositely movable steering member connected to the valve for positioning the same, of a manually operative fluid source for supplying the steering motor when the power operated fluid source is inoperative, comprising a hand pump operative to supply fluid through the steering valve to the steering motor, a shaft for operating the pump, a crank member for operating the pump through said shaft, and means operatively connecting the crank member and the said steering member whereby movement of the crank member will be transmitted to the steering member to position the steering valve, and the said crank member being connected through a lost motion connection with said pump shaft whereby limited movement of the steering member transmitted through said friction means to the crank member will have no effect on the pump shaft.

19. In a hydraulic steering gear for a motor vehicle having an operator's station, the combination comprising a fluid operated steering motor, a source of fluid under pressure, a steering valve for controlling fluid flow to the steering motor, a steering member and steering wheel operatively connected to the steering valve for controlling same, means supporting the steering member and steering wheel for up and down adjustments with respect to the operator's station, there being flexible, conduit fluid carrying connections between the steering valve and the steering motor and fluid source by virtue of which said connections steering may be carried out in any adjusted position of the steering member and wheel, latch means for releasably holding the steering member and wheel in a lowered position, and spring means for elevating the steering member and wheel when unlatched.

20. In a hydraulic steering gear for a motor vehicle having an operator's station, the combination comprising a fluid operated steering motor, a source of fluid under pressure, a steering valve for controlling fluid flow to the steering motor, a steering member and steering wheel operatively connected to the steering valve for controlling same, means supporting the steering member and steering wheel for up and down and transverse shifting adjustments with respect to the operator's station, there being flexible, conduit fluid carrying connections between the steering valve and the steering motor and fluid source by virtue of which said connections steering may be carried out in any adjusted position of the steering member and wheel.

ROLAND W. KNAPP.

REFERENCES CITED

The following references are of record in the file of this patent:

UNITED STATES PATENTS

| Number | Name | Date |
|---|---|---|
| D. 138,079 | Drew | June 13, 1944 |
| 729,538 | Buffum | June 2, 1903 |
| 748,252 | Anderson | Dec. 29, 1903 |
| 1,857,380 | Hubbell, Jr. | May 10, 1932 |
| 1,937,485 | Davis | Nov. 28, 1933 |
| 2,020,951 | Lemon | Nov. 12, 1935 |
| 2,037,505 | Eaton | Apr. 14, 1936 |
| 2,206,431 | Schoenbeckler | July 2, 1940 |
| 2,321,377 | French | June 8, 1943 |

FOREIGN PATENTS

| Number | Country | Date |
|---|---|---|
| 435 | Great Britain | Jan. 1, 1903 |